United States Patent
Moon

(10) Patent No.: US 9,226,096 B2
(45) Date of Patent: Dec. 29, 2015

(54) CALL RELAY FUNCTION SUPPORT SYSTEM AND METHOD

(75) Inventor: Byoung Seoup Moon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 25 days.

(21) Appl. No.: 13/296,650

(22) Filed: Nov. 15, 2011

(65) Prior Publication Data

US 2012/0122431 A1    May 17, 2012

(30) Foreign Application Priority Data

Nov. 15, 2010   (KR) .................. 10-2010-0113180

(51) Int. Cl.
| | |
|---|---|
| *H04M 3/42* | (2006.01) |
| *H04W 4/00* | (2009.01) |
| *H04M 1/725* | (2006.01) |
| *H04W 4/16* | (2009.01) |
| *H04M 3/00* | (2006.01) |
| *H04M 11/04* | (2006.01) |

(52) U.S. Cl.
CPC ............. *H04W 4/008* (2013.01); *H04M 1/7253* (2013.01); *H04M 1/72547* (2013.01); *H04W 4/16* (2013.01)

(58) Field of Classification Search
CPC .......... H04M 1/7253; H04M 1/72547; H04W 4/008; H04W 4/16
USPC ....................................................... 455/414.1
See application file for complete search history.

(56) References Cited

U.S. PATENT DOCUMENTS

| | | | |
|---|---|---|---|
| 5,628,055 A * | 5/1997 | Stein ........................... | 455/575.1 |
| 5,809,115 A * | 9/1998 | Inkinen ....................... | 379/93.05 |
| 6,633,759 B1* | 10/2003 | Kobayashi ................... | 455/419 |
| 2005/0222858 A1* | 10/2005 | Okada ............................... | 705/1 |
| 2007/0091833 A1* | 4/2007 | Bauchot et al. ................ | 370/310 |
| 2008/0031176 A1* | 2/2008 | Hus ................................ | 370/312 |
| 2009/0239470 A1 | 9/2009 | Sherman | |
| 2010/0062805 A1* | 3/2010 | Moran et al. ................ | 455/556.1 |
| 2010/0234051 A1* | 9/2010 | Holden et al. ................ | 455/466 |
| 2010/0279647 A1* | 11/2010 | Jacobs et al. ................. | 455/404.1 |
| 2010/0313082 A1* | 12/2010 | Kim et al. ........................ | 714/57 |
| 2011/0158212 A1* | 6/2011 | Sakai et al. .................... | 370/338 |

FOREIGN PATENT DOCUMENTS

| | | | |
|---|---|---|---|
| KR | 10-2008-0082194 A | | 9/2008 |
| KR | 10-2009-0006587 A | | 1/2009 |
| WO | WO 2008/096983 | * | 2/2008 |

* cited by examiner

*Primary Examiner* — Timothy Pham
(74) *Attorney, Agent, or Firm* — Jefferson IP Law, LLP

(57) ABSTRACT

A system and method of supporting a call relay function is provided. The system includes a second modem terminal for performing a call connection with a first modem terminal through a network, the first modem terminal for relaying a call by forming a near distance communication channel with at least one non-modem terminal when a request for the call connection is received from the second modem terminal, or by supporting a call connection between the second modem terminal and the non-modem terminal and relaying a call to transmit and receive data necessary for execution of a call function when a request for the call connection with the second modem terminal is received from a non-modem terminal in which the communication channel is formed, and the non-modem terminal for performing a call function with the second modem terminal based on the call relay function of the first modem terminal.

22 Claims, 5 Drawing Sheets

CALL RELAY FUNCTION SUPPORT SYSTEM AND METHOD

PRIORITY

This application claims the benefit under 35 U.S.C. §119 (a) of a Korean patent application filed on Nov. 15, 2010 in the Korean Intellectual Property Office and assigned Serial No. 10-2010-0113180, the entire disclosure of which is hereby incorporated by reference.

BACKGROUND OF THE INVENTION

1. Field of the Invention

The present invention relates to a mobile terminal. More particularly, the present invention relates to a call relay function support system supporting a non-modem terminal to perform a call function with another modem terminal based on a relay function of a modem terminal, and a method thereof.

2. Description of the Related Art

A portable terminal supports a call function based on mobility and has been used in various fields due to convenience and easy portability. A mobile terminal includes specific function modules therein to support various user functions. For example, the mobile terminal may include a Moving Picture Experts Group (MPEG)-1 or MPEG-2 Audio Layer III (MP3) player module for playing music files and a camera module for an image collecting function.

In the related art, terminals without a mobile communication modem have been introduced to support specific services. A terminal without the mobile communication modem is a non-modem terminal which includes, for example, a computer terminal, a tablet terminal, a TeleVision (TV) terminal, and a car communication terminal. The mobile terminal may also include a modem to support a mobile communication function and a terminal specified to a specific user function without the modem.

Meanwhile, while using the mobile terminal, users frequently place the mobile terminal in a specific location and then perform other tasks. Accordingly, it is convenient for the users to again search a mobile modem terminal to use a call function thereof. In the meantime, it is inconvenient for a user if the mobile modem terminal cannot be located after placing the mobile terminal in a specific location.

SUMMARY OF THE INVENTION

Aspects of the present invention are to address at least the above-mentioned problems and/or disadvantages and to provide at least the advantages described below. Accordingly, an aspect of the present invention is to provide a call relay function support system for setting a modem terminal as a relay of a call function and for supporting use of a call function using a non-modem terminal capable of performing near distance communication with the modem terminal, and a method thereof.

In accordance with an aspect of the present invention, a call relay function supporting system is provided. The system includes a second modem terminal for performing a call connection with a first modem terminal through a mobile communication network, the first modem terminal for relaying a call by forming a near distance communication channel with at least one non-modem terminal when a request for the call connection is received from the second modem terminal, or by supporting call connection between the second modem terminal and the non-modem terminal and relaying a call to transmit and receive data necessary for execution of a call function when a request for the call connection with the second modem terminal is received from a non-modem terminal in which the near distance communication channel is formed, and the non-modem terminal for performing a call function with the second modem terminal based on the call relay function of the first modem terminal.

In accordance with another aspect of the present invention, a method for supporting a transmission call relay function is provided. The method includes forming a near distance communication channel between non-modem terminal registered by the call relay function and a first modem terminal, receiving a message requesting a call connection from the non-modem terminal based on the near distance communication channel, attempting call connection with a second modem terminal by the first modem terminal based on the message requesting the call connection, and relaying a call by transmitting and receiving data according to execution of a call function between the non-modem terminal and the second modem terminal based on the call relay function of the first modem terminal.

In accordance with a further aspect of the present invention, a method for supporting a reception call relay function is provided. The method includes receiving a request for a call connection from a second modem terminal by a first modem terminal, forming a near distance communication channel between non-modem terminal registered by the call relay function and the first modem terminal, relaying a call by transmitting and receiving data according to execution of a call function between the non-modem terminal and the second modem terminal based on the call relay function of the first modem terminal when the near distance communication channel is formed.

A call relay function support system and a method thereof according to an exemplary embodiment of the present invention support use of a call function using a non-modem terminal. Further, if a user does not exactly memorize the location of the modem terminal, an exemplary embodiment of the present invention supports use of a modem based user function using a non-modem terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
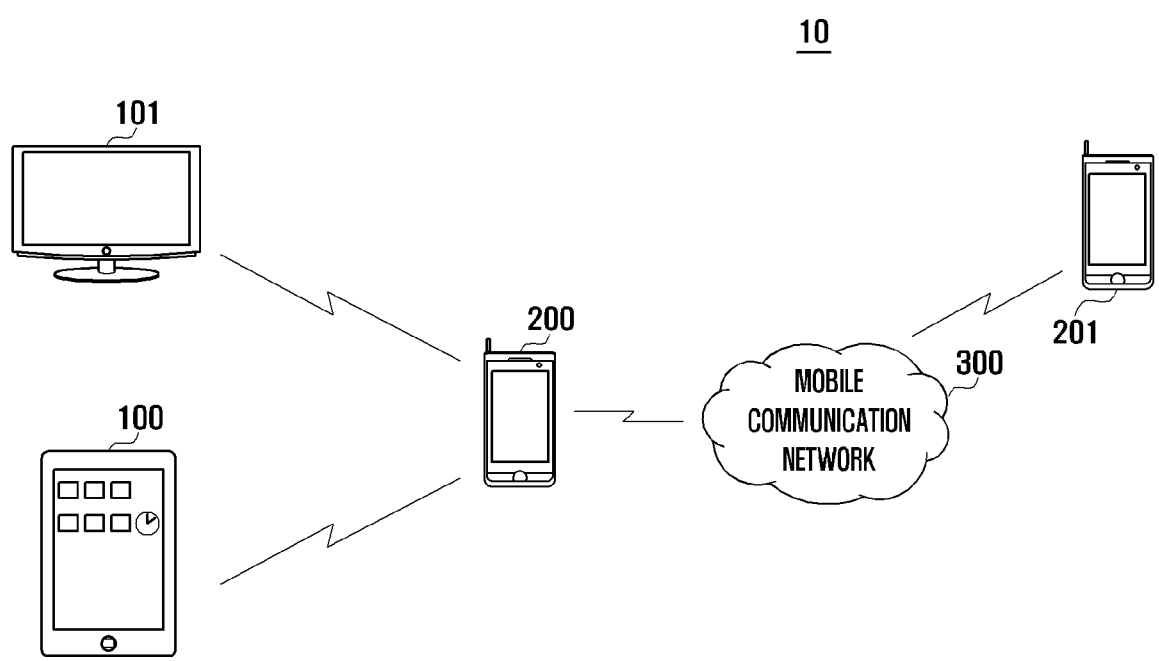
FIG. 1 is a view illustrating a configuration of a call relay function support system according to an exemplary embodiment of the present invention.

FIG. 1 is a view illustrating a configuration of a call relay function supporting system according to an exemplary embodiment of the present invention.

Referring to FIG. 1, a call relay function supporting system 10 may include non-modem terminals 100 and 101, a first modem terminal 200, a mobile communication network 300, and a second modem terminal 201.

The call relay function supporting system 10 having a construction described above may control the first modem terminal 200 to operate a call relay function according to a user's setting or control of the first modem terminal 200 while the first modem terminal 200 performs a call with the second modem terminal 201 to support a call function of the non-modem terminals 100 and 101 for forming a call channel with the first modem terminal 200 and the second terminal 201. Hereinafter, structural elements of the call relay function supporting system 10 will be described in more detail below.

The first and second non-modem terminals 100 and 101 do not have a modem and may not directly communicate with the mobile communication network 300. The first and second non-modem terminals 100 and 101 may communicate with another non-modem terminal or another modem terminal using mounted near distance communication modules. More particularly, the first and second non-modem terminals 100 and 101 may perform near distance communication with the first modem terminal 200, and perform a communication function with the second modem terminal 201 based on a call relay function of the first modem terminal 200. That is, the first and second modem terminals 100 and 101 may support the call function with the second terminal 201 through the mobile communication network 300 by using the first modem terminal 200 as a call relay terminal. The first and second modem terminals 100 and 101 may be a laptop computer, a desktop computer, a TV terminal, a portable large screen terminal, and the like. The first and second modem terminals 100 and 101 may become a partial or entire configuration of an electronic communication system implemented in a car. Exemplary constructions of the first and second non-modem terminals 100 and 101 will be described below with reference to FIG. 2.

The first modem terminal 200 communicates with the second modem terminal 201 through the mobile communication network 300. The first modem terminal 200 may form a communication channel for a call with the second modem terminal 201 according to a user's request. More particularly, the first modem terminal 200 may form a near distance communication channel with at least one of the first and second non-modem terminals 100 and 101 according to a user's setting or a user's input control, and relay signals generated during execution of the call function. That is, the first modem terminal 200 may function as a call function relay of the first and second non-modem terminals 100 and 101. Exemplary constructions of the first modem terminal 200 will be described below with reference to FIG. 3.

The mobile communication network 300 supports transmission and reception of signals necessary for a call function between the first modem terminal 200 and the second modem terminal 201. That is, when the second modem terminal 201 requests a call to the first modem terminal 200, the mobile communication network 300 transmits a call connection request message to the first modem terminal 200. When the first modem terminal 200 transmits a response message to the call connection request message, the mobile communication network 300 forms a call channel between the second modem terminal 201 and the first modem terminal 200, and supports transmission and reception of a signal for a call. The mobile communication network 300 may support at least one of various communication schemes. That is, the mobile communication network may be configured by system equipment capable of supporting various communication schemes such as a Code Division Multiple Access (CDMA), a Time Division Multiple Access (TDMA), a Wideband Code Division Multiple Access (WCDMA), and a Frequency Division Multiple Access (FDMA).

The second modem terminal 201 forms a communication channel with the first modem terminal 200 through the mobile communication network 300. The second terminal 201 has substantially the same configuration as the first modem terminal 200 except for presence of a near distance communication module. That is, when the first modem terminal 200 functions as a transmission side terminal, the second modem terminal 201 functions as a reception side terminal. Conversely, when the first modem terminal 200 functions as a reception side terminal, the second modem terminal 201 functions as a transmission side terminal. When the second terminal 201 includes a near distance communication module, it may form a near distance communication channel with the non-modem terminals disposed at an adjacent region like the first modem terminal 200, and support a call relay function like the first modem terminal 200.

As described above, in the call relay function supporting system 10 according to an exemplary embodiment of the present invention, a non-modem terminal accessible to the mobile communication network 300 is constructed to function as a relay such that a non-modem terminal may perform a call function with another modem terminal through the modem terminal. Through this, the call relay function supporting system 10 may perform a call function using a non-modem terminal in an environment capable of not directly operating a modem terminal when it is complicated to operate a modem terminal.

Figure 2:
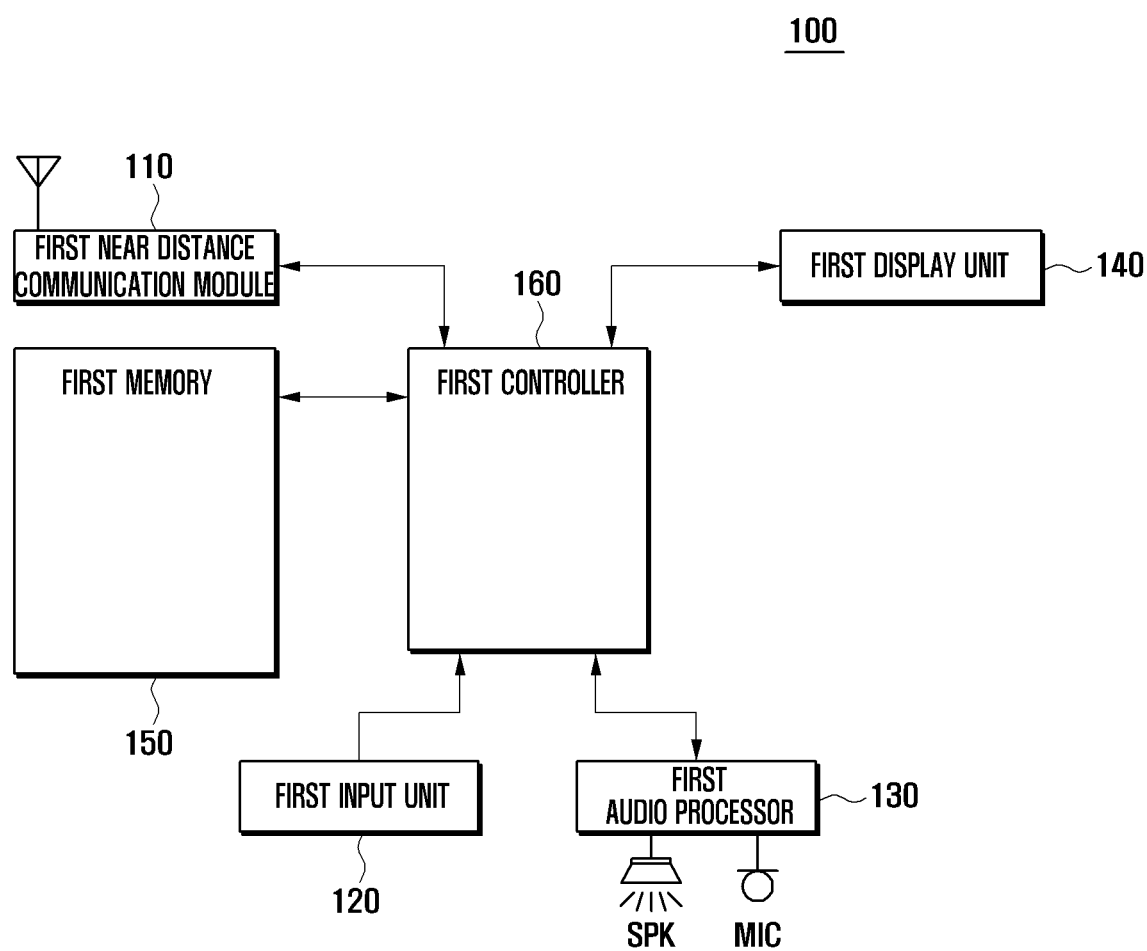
FIG. 2 is a block diagram illustrating a configuration of a non-modem terminal according to an exemplary embodiment of the present invention.

FIG. 2 is a block diagram illustrating a configuration of a non-modem terminal according to an exemplary embodiment of the present invention. Hereinafter, for convenience of description, one non-modem terminal 100 among a plurality of non-modem terminals is illustrated by way of example. As illustrated previously, the first modem terminal 200 and the second modem terminal 201 may be configured by the same terminal. Accordingly, hereinafter, roles and functions of the first modem terminal 200 will be described as an example of a non-modem terminal.

Referring to FIG. 2, the non-modem terminal 100 may include a first near distance communication module 110, a first input unit 120, a first audio processor 130, a first display unit 140, a first memory 150, and a first controller 160.

The non-modem terminal 100 having a construction described above may form a near distance communication channel with the first modem terminal 200 using the first near distance communication module 110, and perform a call function with another modem terminal using the first modem terminal 200 according to presence of a call relay function support of the first modem terminal 200. Although not illustrated, the non-modem terminal 100 includes a dialer, a videophone program, and a Telephone Application Program Interface (TAPI) for supporting a call dial or a call reception function. The non-modem terminal 100 may perform a call function with a first modem terminal 200 using corresponding programs and routines and the first near distance communication module 110. The first near distance communication module 110 structural element will be described in detail below.

The first distance communication module 110 forms a near distance communication channel with a near distance communication module provided at the first modem terminal 200. The first near distance communication module 110 may be configured by at least one of various communication modules such as a Bluetooth module, an infrared module, a Zigbee module, an Ultra WideBand (UWB) module, a Near Field Communication (NFC) module, and the like. The first near distance communication module 110 may receive and transfer various signals necessary for a call based on a near distance communication channel formed between the first near distance communication module 110 and the first modem terminal 200. That is, the first near distance communication module 110 may receive data for a speech or videophone call connection and data for a message reception from the first modem terminal 200. The first near distance communication module 110 may transmit data for a call connection, a speech signal to be transmitted based on a connected call channel, and data corresponding to messages or mail of a message service according to a user's control to the first modem terminal 200.

The first input unit 120 generates various input signals necessary for driving the first non-modem terminal 100. The first input unit 120 may be configured in various forms according to a form of the first non-modem terminal 100. For example, when the first non-modem terminal 100 is a laptop computer or a desktop computer, the first input unit 120 may become a keyboard or a mouse. When the first non-modem terminal 100 is a TeleVision (TV) terminal, the first input unit 120 may become buttons. The first input unit 120 may include a plurality of button keys, side keys, and hot keys. The signals generated by the first input unit 120 may include an input signal for a response according to reception for a call connection request message and an input signal for call termination.

The first input unit 102 may input a certain number for a call connection with a certain modem terminal or generate an input signal for selection of a certain item included in phone-book information according to a user's control. In this case, the phone-book information may be phone-book information received from the first modem terminal 200. The phone-book information may be synchronized with the first modem terminal 200 to upgrade corresponding phone-book information. For example, when a specific item of the phone-book information is removed from the first non-modem terminal 100, it may transmit phone-book item removal information to the first modem terminal 200, and the first modem terminal 200 may update a phone-book item stored in a first memory 150 according to the phone-book item removal information of the non-modem terminal 100. The update function of the phone-book information is equally applicable to creation and correction of phone-book items. When the first modem terminal 200 removes, creates, or corrects a specific item of the phone-book information, the first non-modem terminal 100 may receive information about updates of the phone-book information from the first modem terminal 200 to update a phone-book. That is, when a specific item of the phone-book information stored in one of the first non-modem terminal 100 and the first modem terminal 200 is removed, corrected, or updated, data synchronization may be performed to maintain the same phone-book information.

The first audio processor 130 may include a Speaker (SPK) for outputting various audio signals created during driving of the first non-modem terminal 100 and a Microphone (MIC) for collecting a user's voice to support a call function. More particularly, the speaker of the first audio processor 130 may output audio data among call data provided from the first modem terminal 200. When the first modem terminal 200 transfers a message to the speaker, it may output an alarm with respect to reception of a corresponding message. Further, when the first modem terminal 200 transfers a call connection request received from another modem terminal to the speaker, it may output a corresponding alarm. At this time, the first modem terminal 200 may selectively output an alarm with respect to reception of a call connection request according to a user's setting.

The first display unit 140 may be configured by a flat panel display including a thin film transistor such as a Liquid Crystal Display (LCD) or an Organic Light Emitted Diode (OLED) display device. The first display unit 140 may be configured in the form of a touch screen including a touch panel to perform a function of input means. The first display unit 140 outputs various screens created during an operation procedure of the first non-modem terminal 100. For example, the first display unit 140 may output a screen according to fundamental characteristics of the first non-modem terminal 100, for example, a broadcasting receiving screen, a current car state verification screen, and an idle screen output according to schedule information after completion of booting of a computer. More particularly, the first display unit 140 may output various screens according to support of a call function. For example, the first display unit 140 may input numbers for call dial or output a phone-book item selection screen, a screen receiving a call connection request message from another modem terminal, a screen requesting call connection to another modem terminal, and a speech or videophone call connection screen. Further, the first display unit 140 may output a message output screen provided from the first modem terminal 200. When the first display unit 140 does not perform a call connection during a procedure receiving a call connection request message, it may output a screen corresponding to an absent message.

The first memory 150 stores various application programs for the operation of the first non-modem terminal 100 and various data created by the operation of the first non-modem terminal 100. More particularly, the first memory 150 may include a dial program for supporting a call relay function, a videophone call support program, a TAPI, and an application program of the first near distance communication module 110 for exchanging data created according to activation of a corresponding program with the first modem terminal 200. Further, the first memory 150 stores a message relation processing program. When a response input signal is not generated with respect to a call connection request message provided from the first modem terminal 200 for a preset time, the message relation processing program may include a routine for outputting a stored absent message.

Further, the message relation processing program may include a routine for controlling output of at least one of a short message, a multi-media message, and electronic mail provided from the first modem terminal 200 to the first display unit 140, and a routine for transmitting a corresponding message acknowledge signal to the first modem terminal 200 when an input signal for verifying the short message, the multi-media message, and the electronic mail. When the first non-modem terminal 100 verifies the short message, the multi-media message, and the electronic mail, and receives a message acknowledge signal with respect to the verified messages, the first modem terminal 200 may determine that the messages are verified and perform a message acknowledge process. For example, the first modem terminal 200 may remove information output according to non-verified messages.

Meanwhile, the first memory 150 may store data necessary for an operation of the first non-modem terminal 100, for example, contents files, recording files, maps, and the like for road guide. More particularly, the first memory 150 may store messages and phone-book information provided from the first modem terminal 200. The first controller 160 controls various signal flows necessary for an operation of the first non-modem terminal 100. The first controller 160 may control output of a preset message or alarm using the first display unit 140 or the audio processor 130 according to a call connection request message that the first modem terminal 200 receives from the second modem terminal 201 and transmits. That is, the first controller 160 may receive an alarm for the call connection request message. When a response input signal for the reception of the call connection request message is not generated within a preset time, the first controller 160 may control the first display unit 140 to output an absent message with respect to a corresponding call connection request message. Simultaneously, the first controller 160 may transfer a message with respect to non-reception of a call to the first modem terminal 200.

In the meantime, the first controller 160 may control the first display unit 140 to output a screen corresponding to a call function according to a signal input from the first input unit 120. That is, when the first display unit 140 is configured by a touch screen, the first controller 160 may control the first display unit 140 to output a numeral key map or a phone-book according to an input signal. The first controller 160 may transfer input phone numbers, information about specific phone-book items, and a message requesting call connection to another modem terminal to the first modem terminal 200. Next, the first controller 160 may control transmission and reception of speech data or image data relayed by the first modem terminal 200, and control output of data received by the first display unit 140 and the first audio processor 130 or collection of data to be transmitted.

Further, the first controller 160 may support screen interface output for composing at least one of a short message, a multi-media message, and an electronic mail, and control transmission of a phone number of another modem terminal receiving the at least one composed message to the first modem terminal 200 according to a user's input. When the first modem terminal 200 transmits at least one of the short message, the multi-media message, and the electronic mail, the first controller 160 may control the first display unit 140 to output at least one of the received short message, the received multi-media message, and the received electronic mail, and control the first memory 150 to store the message. At this time, when an acknowledge input signal for verifying at least one of the short message, the multi-media message, and the electronic mail is generated, the first controller 160 may control transmission of the message acknowledge signal to the first modem terminal 200.

As described above, the non-modem terminal 100 may support generation, transfer, reception, and output of various signals necessary for a call and message service use functions by using the first modem terminal 200 as a relay.

Figure 3:
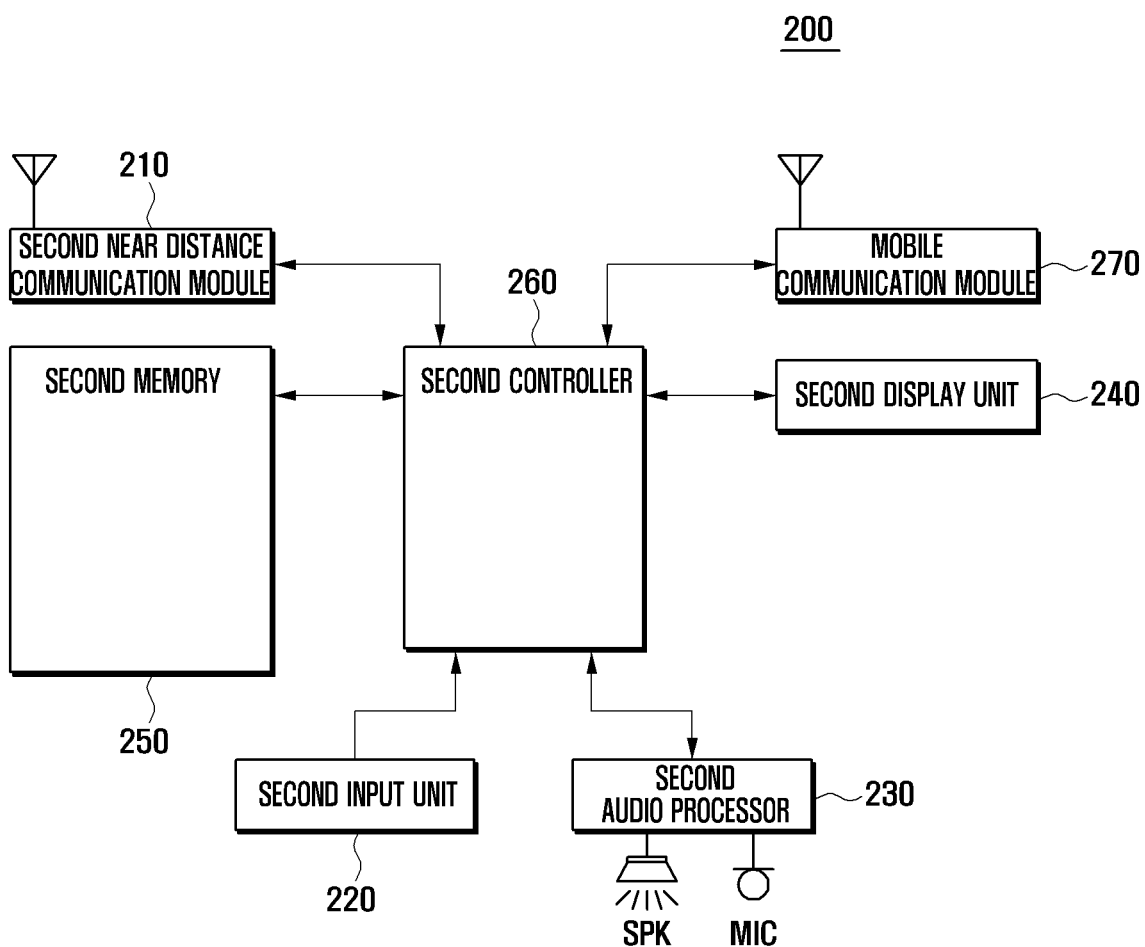
FIG. 3 is a block diagram illustrating a configuration of a modem terminal according to an exemplary embodiment of the present invention.

FIG. 3 is a block diagram illustrating a configuration of a modem terminal according to an exemplary embodiment of the present invention.

Referring to FIG. 3, a first modem terminal 200 may include a second near distance communication module 210, a second input unit 220, a second audio processor 230, a second display unit 240, a second memory 250, a mobile communication module 270, and a second controller 260.

The first modem terminal 200 having a construction described above may change a mode to a call relay function mode during execution of a call function or reception of a call connection request message according to a user's setting or input control of a user, and relay data necessary for a call with another modem terminal 201 and transfer the relayed data to the non-modem terminal 100. Further, the first modem terminal 200 may transfer a signal provided from the non-modem terminal 100 during execution of a call relay function to another modem terminal. More particularly, the first modem terminal 200 may transfer a call connection request message provided from another modem terminal to a plurality of non-modem terminals, and support a call relay function of a non-modem terminal among the plurality of non-modem terminals attempting a response to the call connection request message. The first modem terminal 200 processes non-reception of a short message or a multi-media message, and a received message of the non-modem terminal 100 in association with the non-modem terminal 100. A construction of the first modem terminal 200 will be described in more detail below.

The second near distance communication module 210 forms a communication channel with the first near distance communication module 110 included in the non-modem terminal 100. The second near distance communication module 210 may be configured by the same communication module as that constituting the first near distance communication module 110 based on communication compatibility with the first near distance communication module 110. The second near distance communication module 210 may receive various signals, for example, call dial data and message transmission data provided from the non-modem terminal 100 to support a call relay function of the first modem terminal 200, and transmit the received data to the second modem terminal 201 under the control of the second controller 260. The second near distance communication module 210 may receive and transfer a message acknowledge signal according to receipt of a response message to a call connection request message transmitted to the non-modem terminal 100, an absent signal according to no response, a short message or a multi-media message to the second controller 260. As described above, the second near distance communication module 210 may relay a signal between the non-modem terminal 100 and the second modem terminal 201 while performing a call relay function of the first modem terminal 200, and receive a response signal, an absent signal, and a message acknowledge signal with respect to a call connection request message created by the non-modem terminal 100.

The second input unit 220 may include a plurality of input keys and function keys for receiving numeral or character information and setting various functions. The function keys may include arrow keys, side keys, and hot keys set to perform specific functions. The second input unit 220 may generate and transmit a key input signal associated with function control of the first modem terminal 200 to the second controller 260. More particularly, the second input unit 220 may generate an input signal for a call relay mode change, an input signal for stopping the call relay mode, an input signal for searching a plurality of non-modem terminals, and an input signal for selecting at least one of the plurality of searched non-modem terminals to be operated as a call relay mode according to a user's control. The generated input signals may be transferred to the second controller 260.

The second audio processor 230 may output an audio signal received through a mobile communication module 270 or an audio signal created due to playback of an audio file stored in the second memory 250 to a speaker or transmit an audio signal such as voices input from a MIC through the mobile communication module 270 under the control of the second controller 260 in a call relay stop mode. More particularly, the second audio processor 230 may control both of the speaker and the microphone to be inactivated or only one thereof to be activated in a call relay mode. If the second audio processor 230 receives a call connection request message from the second modem terminal 201 in an activated state of the call relay mode, it may output a guide sound selectively indicating a call relay mode according to a user's setting.

In the same manner as in the first display unit 140 in the non-modem terminal 100, the second display unit 240 includes a display panel displaying user data or function setup information input by a user, and various information provided to the user as well as various menu screens of the first modem terminal 200. The second display unit 240 also includes a touch panel disposed on the display panel to support a function of a touch screen. The second display unit 240 may be configured by a flat panel display including a thin film transistor such as an LCD or an OLED display device. When the second display unit 240 supports a function of a touch screen capable of generating a specific input signal based on the touch panel, it may support a function of input means. More particularly, the second display unit 240 may output various screens for supporting a call relay function according to an exemplary embodiment of the present invention. For example, the second display unit 240 may output a screen indicating reception of a message requesting call connection from the second modem terminal 201, a screen transmitting the received call connection request message to the non-modem terminal 100, a screen transmitting a response message to the call connection request message by the non-modem terminal 100, and a screen instructing formation of a call channel with the second modem terminal 201. Further, the second display unit 240 may output an icon, a message, an indicator, and the like, instructing that a call relay mode is activated.

The second memory 250 may store data input from the second input unit 220, data provided from another mobile terminal, and data provided from the non-modem terminal 100 as well as programs necessary for a function operation of the first modem terminal 200. The second memory 250 may include a program area and a data area.

The program area may store an Operating System (OS) controlling operations of the modem terminal 200 and application programs necessary for playback of multi-media contents. More particularly, the program area according to an exemplary embodiment of the present invention may store a call relay function support program.

The call relay function support program supports the first modem terminal 200 to be activated as a call relay function, and may include a call relay mode routine and a call relay stop mode routine. The call relay mode routine supports the non-modem terminal 100 to execute a call connection with the second modem terminal 201 and supports the first modem terminal 200 to relay data according to a user's setting. The call relay mode routine may include a mode verification sub-routine for verifying the presence of setting a call relay mode at the time of the call connection with the second modem terminal 201, and a communication support sub-routine for supporting formation of a near distance channel with the non-modem terminal 100 that will relay a call while performing the call connection with the second modem terminal 201 when the call relay mode is set.

The call relay stop mode routine stops a currently set call relay mode and supports the first modem terminal 200 to directly perform a call function with the second modem terminal 201 according to a user's input. Respective routines and sub-routines may be loaded onto the second controller 260 to support a call relay function. When a spacing distance between the first modem terminal 200 and the non-modem terminal 100 is great by a distance where a near distance communication channel may not be formed, the call relay stop mode may be automatically set. Accordingly, the first modem terminal 200 performs a call function with another modem terminal based on an automatically set call relay stop mode according to release of the near distance communication channel. Further, the non-modem terminal 100 may support user functions other than the call function. When a spacing distance between the first modem terminal 200 and the non-modem terminal 100 is less than a valid distance where a near distance communication channel may be formed, a near distance communication channel between the first modem terminal 200 and the non-modem terminal 100 may be automatically formed.

The data area is an area in which data created according to use of the first modem terminal 200 are stored, and may store a phone-book, audio data, corresponding contents, user data, and the like. The data area may store information for at least one non-modem terminal 100 relaying a call, a short message or a multi-media message provided from the second modem terminal 201, and a short message or a multi-media message made and transferred by the non-modem terminal 100.

The mobile communication module 270 is provided such that the first modem terminal 200 can support a mobile communication function. The mobile communication module 270 may access a mobile communication network to form a communication channel, and transmit and receive necessary signals such that the first modem terminal 200 may perform a call relay function based on the formed communication channel.

The second controller 260 may control an overall operation and signal flow between internal blocks of the first modem terminal 200, and a data processing function. More particularly, the second controller 260 according to an exemplary embodiment of the present invention controls a signal flow for supporting the call relay function of the first modem terminal 200. In more detail, when receiving a call connection request message from the second modem terminal 201, the second controller 260 may control output of an alarm with respect to reception of a call connection request message for a preset time. When no input signals associated with the call connection are generated for a corresponding time, the second controller 260 may determine whether a call relay mode is set. When the call relay mode is set, the second controller 260 may transfer a call connection request message to at least one non-modem terminal 100 set to support the call relay mode. When a response signal to the call connection from the non-modem terminal 100 is received, the second controller 260 performs a call connection with the second modem terminal 201 and supports signal relay according to the call connection between the second modem terminal 201 and the non-modem terminal 101.

Here, the second controller 260 may not output an alarm with respect to reception of a call connection request message for a preset time, verify the presence of setting of the call relay mode, and support formation of a communication channel with the non-modem terminal 100 without output of a separate alarm. When the formation of a communication channel with at least one non-modem terminal 100 fails, the second controller 260 outputs an alarm with respect to the call connection request message for a preset time, and perform absent processing after a corresponding time elapses. In the meantime, when a response message to the call connection message is not received from the non-modem terminal 100 within the preset time, the second controller 260 may generate an absent message and control the display unit 240 to output the absent message.

When receiving a message requesting a call connection with the second modem terminal 201 from the non-modem terminal 100, the second controller 260 determines whether the call relay mode is set, and performs the call connection with the second modem terminal 201 included in the call connection request message. When the second modem terminal 201 accepts the call connection, the controller 260 may perform a signal relay for supporting a call function between the non-modem terminal 100 and the second modem terminal 201. When the second modem terminal 201 rejects or fails the call connection, the second controller 260 may transfer a message about the call connection failure to the non-modem terminal 100. That is, the second controller 260 may transfer images or messages associated with a call dial state requesting the call connection with the second modem terminal 201, a calling state, a response non-reception state, a response reject state, and a call drop to the non-modem terminal 100. Accordingly, the non-modem terminal 100 may control output of a specific alarm or a screen corresponding to images according to reception of corresponding images or messages.

In the meantime, when receiving a short message or a multi-media message from the second modem terminal 201, the second controller 260 may store the message, transfer a corresponding message to the non-modem terminal 100, and output information associated with reception of the short message or the multi-media message on the second display unit 240. When the non-modem terminal 100 transfers a message reception acknowledge signal with respect to verification for the corresponding short message or multi-media message, the second controller 260 may verify, process, and remove message reception relation information output from the second display unit.

As described above, the first modem terminal 200 may automatically process various user functions associated with a call function, for example, an absent processing function and a message verification processing function while applying a call function with the second modem terminal 201 to a non-modem terminal in association with the non-modem terminal 100.

Structural elements of a call relay function support system and terminals constituting the system have been described above. Hereinafter, an operating method of the respective structural elements of the call relay function support system according to an exemplary embodiment of the present invention will be described below.

Figure 4:
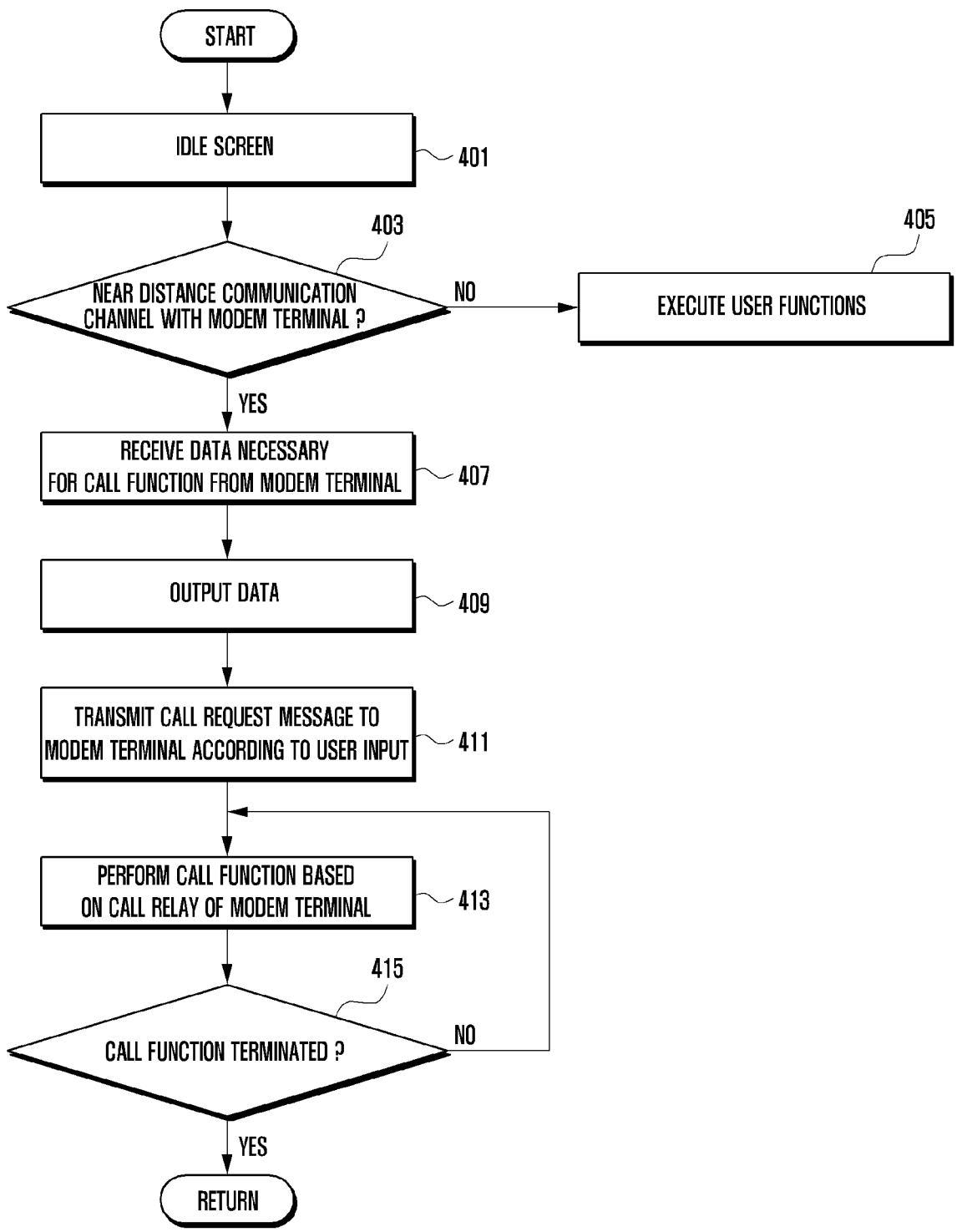
FIG. 4 is a flowchart illustrating a call relay function support method of a non-modem terminal according to an exemplary embodiment of the present invention.

FIG. 4 is a flowchart illustrating a call relay function support method of a non-modem terminal according to an exemplary embodiment of the present invention. A non-modem terminal 200 is described below as an example of a modem terminal and a modem terminal 100 is described as an example of a non-modem terminal.

Referring to FIG. 4, in the call relay function support method of a non-modem terminal 100, if power is supplied to the terminal 100, the first controller 160 controls initialization of respective structural elements of the non-modem terminal 100 based on the supplied power. After termination of the initialization, the first controller 160 may control the first display unit 140 to output an idle screen according to preset schedule information at step 401.

Next, the controller 160 may determine whether the non-modem terminal 100 forms a near distance communication channel with a modem terminal 200 at step 403. When the non-modem terminal 100 does not form a near distance communication channel with a modem terminal 200, the first controller 160 may control execution of user functions, for example, a broadcasting receiving function, a file playback function, a navigation function, and the like provided from a corresponding terminal at step 405.

Conversely, when the non-modem terminal 100 forms a near distance communication channel with the modem terminal 200 at step 403, the first controller 160 receives data necessary for a call function from the modem terminal 200 at step 407. That is, the first controller 160 may receive information such as a phone-book. The first controller 160 may control the first display unit 140 to output the received data at step 409.

Subsequently, the first controller 160 may transmit a call request message to the modem terminal 200 according to a user's input at step 411. Here, the call request message may contain phone number information of another modem terminal that the non-modem terminal 100 will call.

Next, the first controller 160 performs a call function based on a call relay of the modem terminal 200 at step 413. The first controller 160 determines whether the call function is terminated at step 415. When a separate input signal for terminating a separate call is not generated, the processor returns to step 413 and repeats step 413.

Meanwhile, the non-modem terminal 100 may form a near distance communication channel with the modem terminal 200 and receive a call connection request message from the modem terminal 200. Accordingly, the non-modem terminal 100 may generate an acknowledge signal with respect to a corresponding call connection request message according to the user's input, and the acknowledge signal may be transmitted to the modem terminal 200. Next, the non-modem terminal 100 may perform a call function according to support of a call relay function of the modem terminal 200.

Further, the non-modem terminal 100 may form a near distance communication channel with the modem terminal 200 and then receive a short message or a multi-media message from the modem terminal 200. Accordingly, the non-modem terminal 100 may control the display unit 140 to output the received short message or multi-media message or output information indicating reception of the message through the first display unit 140 or the first audio processor 130. Moreover, the non-modem terminal 100 may store the received short message or multi-media message in the first memory 150. When an input signal for verifying the message is generated, the non-modem terminal 100 may control transmission of a message acknowledge signal to the modem terminal 200.

Figure 5:
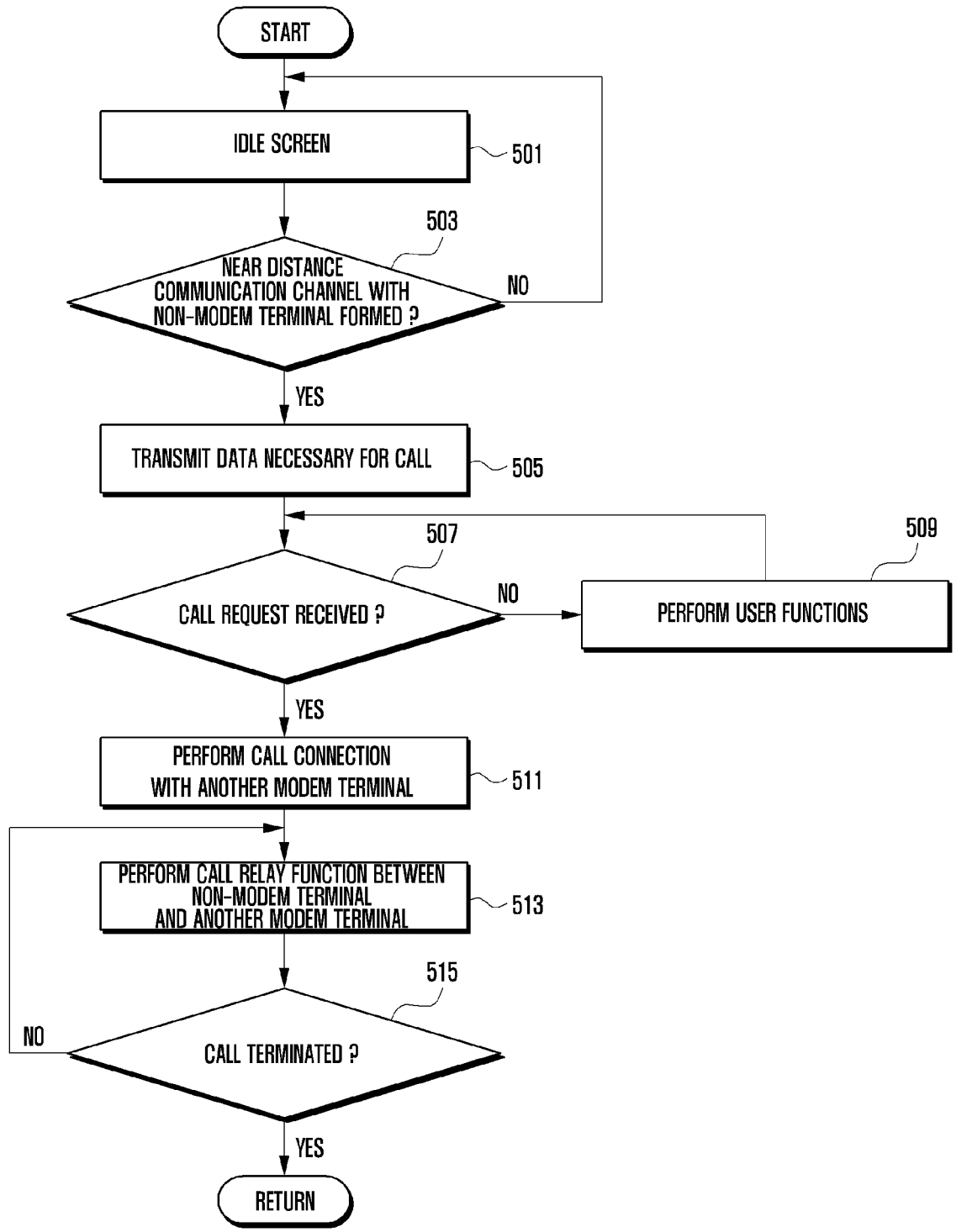
FIG. 5 is a flowchart illustrating a call relay function operation of a modem terminal according to an exemplary embodiment of the present invention.

FIG. 5 is a flowchart illustrating a call relay function operation of a modem terminal according to an exemplary embodiment of the present invention.

Referring to FIG. 5, a modem terminal 200 performs an initializing procedure based on supplied power. If the initializing procedure is terminated, the modem terminal 200 may control output of an idle screen according to preset schedule information at step 501.

Next, the modem terminal 200 determines whether formation of a near distance communication channel with the non-modem terminal 100 is achieved at step 503. When a separate near distance communication channel is not achieved, the modem terminal 100 may maintain output of the idle screen at step 501 or support a user function provided from the modem terminal 200. When the formation of the near distance communication channel with the non-modem terminal 100 is achieved at step 503, the modem terminal 200 may control transmission of data necessary for a call function to the non-modem terminal 100 at step 505.

Subsequently, the modem terminal 200 may determine whether a signal requesting a call connection with another modem terminal is received from the non-modem terminal 100 at step 507. When a separate call request is not received, the modem terminal 100 may perform user functions provided from the modem terminal 100 at step 509.

When the call request is received from the non-modem terminal 100 at step 507, the modem terminal 200 may perform the call connection with another modem terminal according to the call request at step 511. Subsequently, the modem terminal 200 performs a call relay function between the non-modem terminal 100 and another modem terminal at step 513.

Next, the modem terminal 100 determines whether a call is terminated at step 515. When the call is terminated, the process returns to step 501. When the call is maintained, the process returns to step 513 and repeats step 513. Meanwhile, when receiving a message requesting a call connection from another modem terminal, the modem terminal 200 may form a near distance communication channel with a registered non-modem terminal 100, and transmit a corresponding call connection request message to the non-modem terminal 100. When receiving a response message to the call connection request message from the non-modem terminal 100, the modem terminal 200 performs the call connection between another modem terminal and the non-modem terminal 100. At this time, the modem terminal 100 may execute a call relay function. When response messages to the call connection request message are not received from the non-modem terminal 100, the modem terminal 200 may perform an absent processing.

Further, when receiving a short message or a multi-media message from another modem terminal, the modem terminal 200 transmits a corresponding message to the non-modem terminal 100. When receiving a verified message with respect to reception of a corresponding message, the modem terminal 200 may perform a message verification process.

As described above, a call relay function support system and a method thereof may support a call function of a non-modem terminal 100 using a modem terminal 200 to perform a call function in various places without being limited to a location and environment of a user.

In the meantime, a spacing distance between the non-modem terminal 100 and the modem terminal 200 forming the near distance communication channel becomes greater than a preset distance where the near distance communication channel may not be formed, the non-modem terminal 100 and the modem terminal 200 may release the near distance communication channel and support only user functions provided from respective terminals. Further, when the non-modem terminal 100 and the modem terminal 200 enter within a spacing distance enabling formation of the near distance communication channel, the near distance communication channel may be automatically formed to support a call relay function. More particularly, when a call relay function is activated, the modem terminal 200 may search a periphery with a preset time interval or at any time to find a non-modem terminal 100, and automatically form a near distance communication channel with the searched non-modem terminal 100.

When a non-modem terminal 100 registered in a plurality of modem terminals is searched during a procedure supporting a call relay function, the modem terminal 200 may connect a specific non-modem terminal 100 to support a call relay function. For example, the modem terminal 200 may process signals for performing a call relay function with a specific non-modem terminal 100 among a plurality of non-modem terminals 100 designated by a user using an input unit of a modem terminal 200 or an input of a non-modem terminal 100.

Furthermore, the modem terminal 200 may support a call relay function with a non-modem terminal 100 having a higher priority order set by a user. When formation of a near distance communication channel with the non-modem terminal 100 having the highest priority order is impossible in the procedure, the modem terminal 200 may perform signal transmission and reception for forming a near distance communication channel with a non-modem terminal having a second highest priority order.

Meanwhile, the foregoing modem terminal 200 may further include various additional modules according to provision forms. That is, when the mobile terminal 100 is a communication terminal, it may also include a near distance communication module for near distance communication, an interface for exchanging data in a wired communication scheme or a wireless communication scheme of the modem terminal 200, an Internet communication module for communicating with an Internet to perform an Internet function, and a digital broadcasting module for receiving and broadcasting digital broadcasting. Since the structural elements can be variously changed according to trends of a digital device, no elements can be listed. However, the mobile terminal 100 may include structural elements equivalent to the foregoing structural elements. Further, the mobile terminal 100 may be substituted by specific constructions in the foregoing arrangements according to the provided form or another structure. This can be easily understood by those skilled in the art.

Further, the modem terminal 200 according to an exemplary embodiment of the present invention may include various types of device having a communication module capable of performing data communication. For example, the mobile terminal 100 may include an information communication device and a multimedia device such as a Portable Multimedia Player (PMP), a digital broadcasting player, a Personal Digital Assistant (PDA), a music player (e.g., a Moving Picture Experts Group (MPEG)-1 or MPEG-2 Audio Layer III (MP3) player), a portable game terminal, a Smart Phone, a notebook computer, a handheld Personal Computer (PC), and the like, as well as various mobile communication terminals corresponding to various communication systems.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supporting a transmission call relay function, the method comprising:
    searching, by a first modem terminal, a non-modem terminal;
    establishing a connection between the non-modem terminal and the first modem terminal based on a near distance communication channel, the connection configured to enable, on a display of the non-modem terminal, an output of a display of the first modem terminal, and to relay one or more video call or voice call functions performed by the first modem terminal;
    controlling, by an input to the non-modem terminal, the one or more video call or voice call functions of the first modem terminal; and
    attempting a connection with a second modem terminal by the first modem terminal based on a message requesting the call connection,
    wherein the first modem terminal searches a periphery for a preset time or for any amount of time to find the non-modem terminal for maintaining the near distance communication channel when the relay function is activated, and
    wherein the connection is configured to enable the transmission of the one or more video call or voice call functions.

2. The method of claim 1, further comprising performing a communication function with the second modem terminal by the first modem terminal when the first modem terminal changes to a relay stop mode.

3. The method of claim 1, wherein the relay comprises:
    transferring at least one of images and sound associated with at least one of a state requesting the connection to the non-modem terminal, a response reject state, a response non-reception state, a connection state, and a connection drop state by the first modem terminal when at least one of a state requesting a connection from the second modem terminal, a response reject state to the request of the connection, a response non-reception state, a connection state, and a connection drop state is generated; and
    outputting at least one of an alarm and a screen with respect to the at least one of the images and the sound by the non-modem terminal.

4. The method of claim 1, wherein the connection is one of a wired or a wireless connection.

5. The method of claim 1, wherein the non-modem terminal displays information provided to the user in the same manner as in the first modem terminal.

6. A method for supporting a reception relay function, the method comprising:
    establishing a connection between a second modem terminal and a first modem terminal; and
    forming a near distance communication channel between at least one non-modem terminal registered by the relay function and the first modem terminal,
    wherein, the relay function is configured to enable, on a display of the non-modem terminal, an output of a display of the first modem terminal, and to perform a relay of one or more functions performed by the first modem terminal, whereby the one or more functions of the first modem terminal are controlled by an input to the non-modem terminal,
    wherein the first modem terminal performs an absent processing with respect to the request for the connection when the non-modem terminal has not responded within a preset time, and
    wherein the relay is configured to enable the transmission of one or more video call or voice call functions.

7. The method of claim 6, further comprising determining whether a relay mode of the first modem terminal is set.

8. The method of claim 7, wherein the relay comprises at least one of:
    outputting an alarm according to reception of a connection request message for a time and transmitting a connection request message to the non-modem terminal after the preset time elapses when the first modem terminal receives the connection request message from the second modem terminal in a set state of the relay mode;
    transmitting the connection request message to the non-modem terminal when the first modem terminal receives the connection request message from the second modem terminal in a set state of the relay mode; and
    outputting an alarm according to reception of the connection request message by the non-modem terminal when the connection request message is received from the first modem terminal.

9. The method of claim 6, wherein the relay comprises:
    transmitting at least one of the one or more video call or voice call functions to the first modem terminal by the second modem terminal, outputting the at least one of the one or more video call or voice call functions to a display unit when the first modem terminal transmits the at least one of the one or more video call or voice call functions to the non-modem terminal; and
    composing and transmitting the at least one of the one or more video call or voice call functions to the second modem terminal through the first modem terminal by the non-modem terminal.

10. The method of claim 9, wherein the relay comprises:
    processing the at least one of the one or more video call or voice call functions received by the first modem terminal.

11. The method of claim 6, further comprising at least one of:
    performing a function with the second modem terminal by the first modem terminal when the first modem terminal changes to a relay stop mode;
    automatically changing the first modem terminal to a relay stop mode to perform the function and performing corresponding user functions other than the function by the non-modem terminal when a spacing distance between the first modem terminal and the non-modem terminal is great by a distance where a near distance communication channel is not formed; and searching at least one non-modem terminal registered by a relay function by the first modem terminal before forming the near distance communication channel, and forming a near distance communication channel with at least one non-modem terminal according to a priority order list set to the first modem terminal when there are a plurality of non-modem terminals.

12. The method of claim 6, wherein the connection is one of a wired or a wireless connection.

13. The method of claim 6, wherein the non-modem terminal displays information provided to the user in the same manner as in the first modem terminal.

14. A system for supporting a call relay function, the system comprising:
a second modem terminal configured to perform a call connection with a first modem terminal through a mobile communication network;
the first modem terminal configured to relay at least one of a video call function and a voice call function by at least one of forming a near distance communication channel with at least one non-modem terminal when a request for the connection is received from the second modem terminal and supporting a connection between the second modem terminal and the non-modem terminal and executing a communication function when a request for the call connection with the second modem terminal is received from a non-modem terminal in which the near distance communication channel is formed; and
the non-modem terminal configured to perform a communication function with the second modem terminal based on the relay function of the first modem terminal,
wherein the first modem terminal performs an absent processing with respect to the request for the connection when the non-modem terminal has not responded within a preset time,
wherein the relay function is configured to enable, on a display of the non-modem terminal, an output of a display of the first modem terminal, and to perform a relay of one or more functions performed by the first modem terminal, whereby the one or more functions of the first modem terminal are controlled by an input to the non-modem terminal, and
wherein the relay function is configured to enable the transmission of the at least one of the video call function and the voice call function.

15. The system of claim 14, wherein the non-modem terminal comprises:
a first input unit;
a first near distance communication module for forming a near distance communication channel with the first modem terminal; and
a first controller for controlling signals for supporting a relay function according to a signal input from the first input unit.

16. The system of claim 15, wherein the non-modem terminal comprises:
a first display unit for outputting the at least one of the video call function and the voice call function transmitted from the second modem terminal through the first modem terminal and a screen according to reception of the request of the connection; and
a first audio processor for outputting an alarm according to reception of a connection request message transmitted from the second modem terminal through the first modem terminal.

17. The system of claim 15, wherein the first controller controls the first display unit to output a connection failure message when there is no response to the request for the connection from the second modem terminal.

18. The system of claim 14, wherein the first modem terminal comprises:
a second near distance communication module for forming a near distance communication channel with the non-modem terminal;
a mobile communication module for supporting a relay function with the second modem terminal;
a second memory for storing information of non-modem terminals registered by a relay function;
a second display unit for outputting a screen with respect to the relay; and
a second controller for controlling signal flow for supporting the relay function of the first modem terminal.

19. The system of claim 18, wherein the second controller determines whether a relay mode is set when a request for the connection is received from the second modem terminal, controls the relay between the non-modem terminal and the second modem terminal when the relay mode is activated, controls signals for the connection between the first modem terminal and the second modem terminal when an input signal for a relay stop mode change is generated during the relay, controls output of an alarm with respect to reception of the request for the connection for the preset time when the request for the connection is received from the second modem terminal, and controls transfer of the request for the connection to the non-modem terminal or transmission of the request for the connection to the non-modem terminal without output of a separate alarm after the preset time elapses.

20. The system of claim 18, wherein the second controller controls transmission of the at least one of the video call function and the voice call function to the non-modem terminal when the at least one of the video call function and the voice call function is received from the second modem terminal.

21. The system of claim 14, wherein the first modem terminal automatically releases a relay mode and performs the function with the second modem terminal when the non-modem terminal is spaced apart by a distance not to form a near distance communication channel, and
forms a near distance communication channel with at least one non-modem terminal according to a priority order set to the first modem terminal when a plurality of non-modem terminals are searched, and forms a distance near communication channel with a non-modem terminal of the second highest priority order when the non-modem terminal of a priority order is not located within the distance to form a near distance communication channel.

22. The system of claim 14, wherein the connection is one of a wired or a wireless connection.

* * * * *